(12) United States Patent
Zhang et al.

(10) Patent No.: US 10,770,843 B1
(45) Date of Patent: Sep. 8, 2020

(54) WALL MOUNTED POWER SUPPLY DEVICE

(71) Applicant: Long Zhang, Suzhou (CN)

(72) Inventors: Long Zhang, Suzhou (CN); Fei Lin, Suzhou (CN)

(73) Assignee: Long Zhang, Suzhou (CN)

( * ) Notice: Subject to any disclaimer, the term of this patent is extended or adjusted under 35 U.S.C. 154(b) by 0 days.

(21) Appl. No.: 16/391,077

(22) Filed: Apr. 22, 2019

(30) Foreign Application Priority Data

Apr. 18, 2019 (CN) .................... 2019 2 0528585 U (51) Int. Cl.
| | |
|---|---|
| *H01R 13/66* | (2006.01) |
| *H01R 24/76* | (2011.01) |
| *G06F 1/26* | (2006.01) |
| *H01R 25/00* | (2006.01) |
| *H01R 27/02* | (2006.01) |

(52) U.S. Cl.
CPC ........... *H01R 13/6675* (2013.01); *G06F 1/26* (2013.01); *H01R 24/76* (2013.01); *H01R 25/006* (2013.01); *H01R 27/02* (2013.01); *G06F 2213/0042* (2013.01)

(58) Field of Classification Search
CPC ............ H02G 3/14; H02G 3/18; H02G 3/083; H02G 3/086; H02G 3/10; H01R 25/006; H01R 13/02; H01R 13/04; H01R 13/10; H01R 13/20; H01R 13/40; H01R 13/44; H01R 13/447; H01R 13/46; H01R 13/502; H01R 12/7088
See application file for complete search history.

(56) References Cited

U.S. PATENT DOCUMENTS

| | | | | |
|---|---|---|---|---|
| 7,701,680 | B2* | 4/2010 | Li ..................... | H01H 83/04 |
| | | | | 361/42 |
| 8,384,241 | B2* | 2/2013 | Chen ................. | H01R 31/065 |
| | | | | 307/11 |
| 8,758,031 | B2* | 6/2014 | Cheng ............... | H01H 13/20 |
| | | | | 439/107 |
| 8,794,997 | B2* | 8/2014 | Tin .................... | H01R 25/006 |
| | | | | 439/535 |
| 9,350,557 | B2* | 5/2016 | Rivera .............. | H04L 12/10 |
| 9,464,795 | B2* | 10/2016 | Ebeling ............ | H01R 13/6641 |
| 9,685,783 | B2* | 6/2017 | Raneri .............. | H01R 13/6683 |
| 10,116,102 | B2* | 10/2018 | Randall ............. | H02J 7/0042 |

(Continued)

*Primary Examiner* — Edwin A. Leon
*Assistant Examiner* — Matthew T Dzierzynski
(74) *Attorney, Agent, or Firm* — Chen Yoshimura LLP (57) ABSTRACT

A wall mounted power supply receptacle device includes a body, a core disposed inside the body, and an insertion plate assembly. The body includes a upper body portion and a base connected to each other. The core includes a first circuit board assembly and a second circuit board assembly. The first circuit board assembly is accommodated inside the base and potted with a high thermal conductivity material. The insertion plate assembly includes insertion plates and wiring terminals and is mounted via a middle support frame above the first circuit board assembly. The second circuit board assembly is mounted via a grounding frame above the middle support frame. The grounding frame includes a U shaped notch that drops toward the base to accommodate the second circuit board assembly. The second circuit board assembly is electrically coupled to the first circuit board assembly through the wiring holes of the grounding frame.

19 Claims, 10 Drawing Sheets

(56) References Cited

U.S. PATENT DOCUMENTS

| | | | |
|---|---|---|---|
| 10,193,285 B1* | 1/2019 | Satyanarayanan | H01R 27/02 |
| 10,461,484 B2* | 10/2019 | Murahari | H01R 24/62 |
| 10,483,679 B1* | 11/2019 | Kadam | H01R 13/447 |
| 10,505,326 B2* | 12/2019 | Chien | H01R 13/665 |
| 10,506,316 B2* | 12/2019 | Ebeling | G08B 25/08 |
| 2014/0367136 A1* | 12/2014 | Trojanowski | H02G 3/14 |
| | | | 174/66 |
| 2017/0187155 A1* | 6/2017 | Jansen | H02G 3/12 |
| 2019/0097364 A1* | 3/2019 | Mortun | H01R 13/6683 |
| 2019/0159318 A1* | 5/2019 | Mozdzer | H01R 13/7175 |
| 2019/0229478 A1* | 7/2019 | Iaconis | H04N 5/2257 |
| 2019/0341712 A1* | 11/2019 | Byrne | H01R 13/73 |
| 2019/0348829 A1* | 11/2019 | Davis | H02H 3/08 |
| 2019/0348848 A1* | 11/2019 | Segnit | H02J 7/0042 |

* cited by examiner

WALL MOUNTED POWER SUPPLY DEVICE

BACKGROUND OF THE INVENTION

Field of the Invention

This invention generally relates to electrical devices, and in particular, it relates to a wall mounted power supply device for supplying power to home electrical appliances.

Description of Related Art

With the wide spread of home electrical appliances, the demand for power supplies in homes increases as well. Power supply devices not only provide power outlets in a convenient manner, they often have multiple functions. For example, many power supply devices for household use today have USB (Universal Serial Bus) power supply functions; i.e., the power supply devices have USB connectors on their faceplate, which are coupled to circuitry inside the housing to provide USB power. Such devices can be used to charge devices such as mobile phones, tablet computers, MP3 players, etc., which require power supplies complying with the USB protocol. However, many conventional power supply receptacles have too few output ports or do not have a variety of output ports, and cannot meet the requirements for different charging ports for different electrical devices (e.g., USB Type-A and Type-C ports).

Further, today's electrical devices have increased charging requirements, such as high charging speeds that can charge the devices quickly. However, due to large output currents, the heat generated by the circuitry in the power supply increases, which may cause overheating. Moreover, for power receptacles installed in walls, because their physical size are governed by standards, when USB components are provided, the space restraints affect the placements of the electrical components inside, which often limit the functions that can be provided by the power receptacles.

SUMMARY

To solve the above problems, the present invention is directed to a power supply receptacle that combines multiple ports, while maintaining the traditional two-prong insertion output to fulfill the traditional power supply functions. Further, the power supply receptacle can meet the requirements of large output current and fast charging capabilities using the limited physical sizes, and can also avoid overheating.

To achieve the above objects, in one aspect, the present invention provides a wall mounted power supply receptacle device, which includes: a body; a core disposed inside the body; and an insertion plate assembly; wherein the body includes a upper body portion and a base connected to each other, wherein the core includes a first circuit board assembly and a second circuit board assembly, wherein the first circuit board assembly is accommodated inside the base and is potted with a high thermal conductivity material, wherein the insertion plate assembly includes insertion plates and wiring terminals and is mounted via a middle support frame above the first circuit board assembly, and the second circuit board assembly is mounted via a grounding frame above the middle support frame, wherein the grounding frame includes a U shaped notch that drops toward the base and the second circuit board assembly is disposed in the U shaped notch, and wherein the second circuit board assembly is electrically coupled to the first circuit board assembly through wiring holes of the grounding frame.

Based on the above structure, the invention may include one or more preferred embodiments.

In some embodiments, the second circuit board assembly is a PCB (printed circuit board) assembly for USB (Universal Serial Bus) output and includes at least one USB output port.

In some embodiments, the device further includes an insulating plate disposed between the U shaped notch and the second circuit board assembly.

In some embodiments, the upper body portion includes a plurality of first output holes corresponding to the insertion plate assembly and at least one second output hole correspond to the second circuit board assembly, wherein the device further comprises a top cover connected to the upper body portion by a snap connector, and wherein the top cover includes a plurality of openings, wherein at least one of the plurality of openings corresponds to a second output hole of the upper body portion and has a different shape or size than the corresponding second output hole.

In some embodiments, the snap connector includes at least one hook and/or buckle disposed along an edge of the top cover and at least one corresponding buckle and/or hook disposed along an edge of the upper body portion.

In some embodiments, the hook includes a cantilevered arm extending from the edge of the top cover or the edge of the upper body portion, and a claw located at a free end of the arm, wherein the buckle include a slot located on the edge of the upper body portion or the edge of the top cover, wherein the claw of the hook is configured to fit in and be retained in the slot by a resilient force and configured to be freed from the slot when the arm is pressed in.

In some embodiments, at least a part of an outside surface of the hook has a friction structure.

In some embodiments, the friction structure includes one or more of a line pattern, a cross hatch pattern, protruding dots, or protruding ridges.

In some embodiments, the device further includes at least one mis-insertion prevention assembly disposed between the upper body portion and the insertion plate assembly.

In some embodiments, the wiring terminal of the insertion plate assembly is either connected directly to the insertion plates or connected to the insertion plates via pressing plates.

In another aspect, the present invention provides a wall mounted power supply receptacle device, which includes: a body; a core disposed inside the body; and an insertion plate assembly; wherein the body includes a upper body portion and a base connected to each other, wherein the core includes a first circuit board assembly and a second circuit board assembly, wherein the first circuit board assembly is accommodated inside the base and is potted with a high thermal conductivity material, wherein the insertion plate assembly and the second circuit board assembly are disposed above the first circuit board assembly, wherein the device further includes a top cover connected to the upper body portion, and wherein the top cover includes a plurality of first openings and a plurality of second openings, the first openings configured to receive prongs of a power plug, and the second openings configured to receive one or more of an USB Type-A plug or a USB Type-C plug.

The power supply receptacle according to embodiments of the present invention effectively prevents overheating caused by large output current and fast charging, and provides many power output ports within a limited space. By using a top cover that can be disassembled easily by users, the device can meet requirements for different charging ports. The device is compact in structure, low cost, easy to install, reliable, and widely useful in many applications.

BRIEF DESCRIPTION OF THE DRAWINGS

Preferred embodiments of the present invention are described with reference to the drawings. In these drawings, like reference symbols represent like features.

DETAILED DESCRIPTION OF PREFERRED EMBODIMENTS

A wall mounted power supply receptacle according to preferred embodiments of the present are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

The power supply receptacle has a sealed body after assembly. In the descriptions below, "inside" and "outside" refer to the inside and outside of the body.

Figure 1:
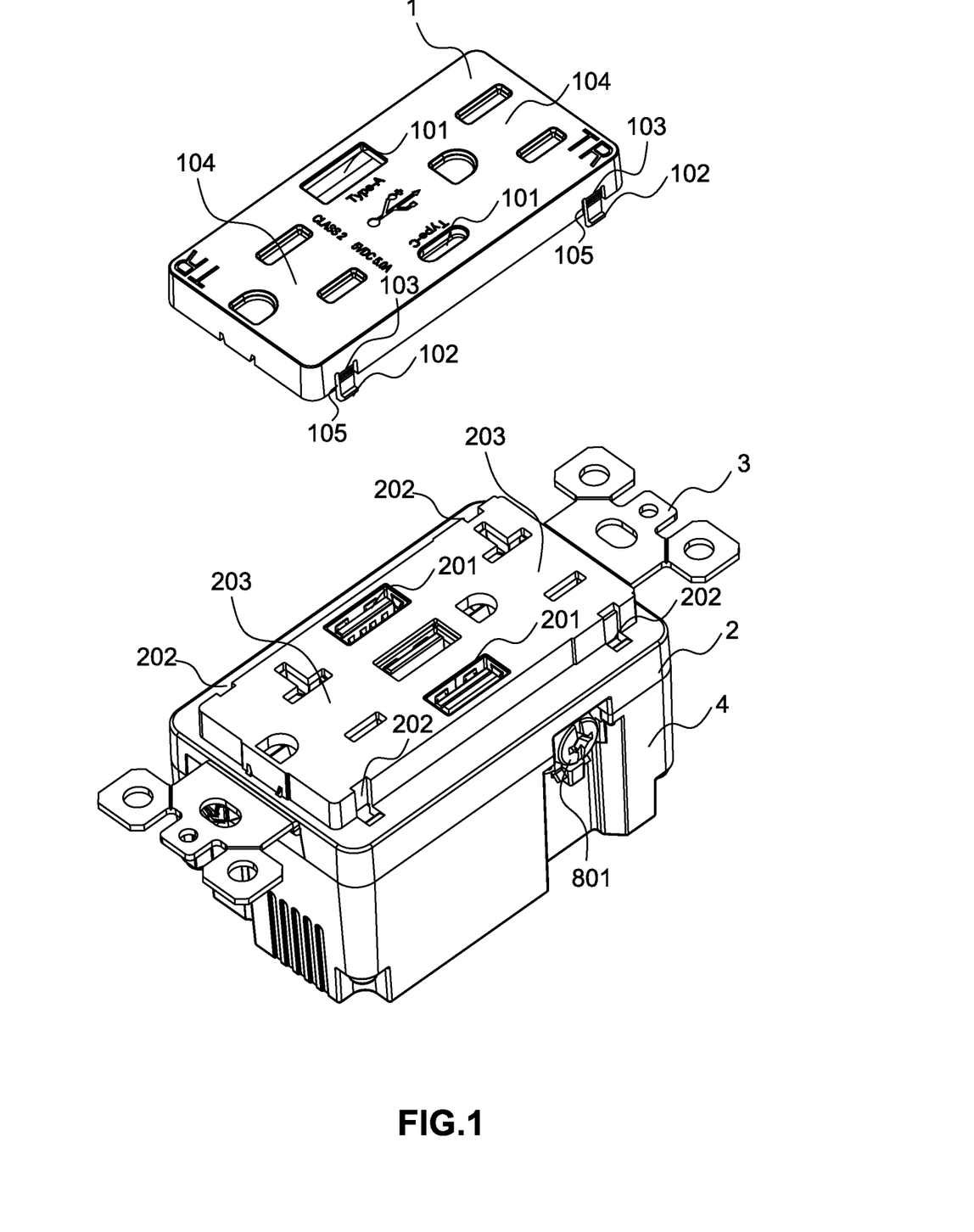
FIG. 1 illustrates a power supply receptacle according to an embodiment of the present invention, showing a top cover disassembled from the upper body portion of the receptacle.
Figure 2:
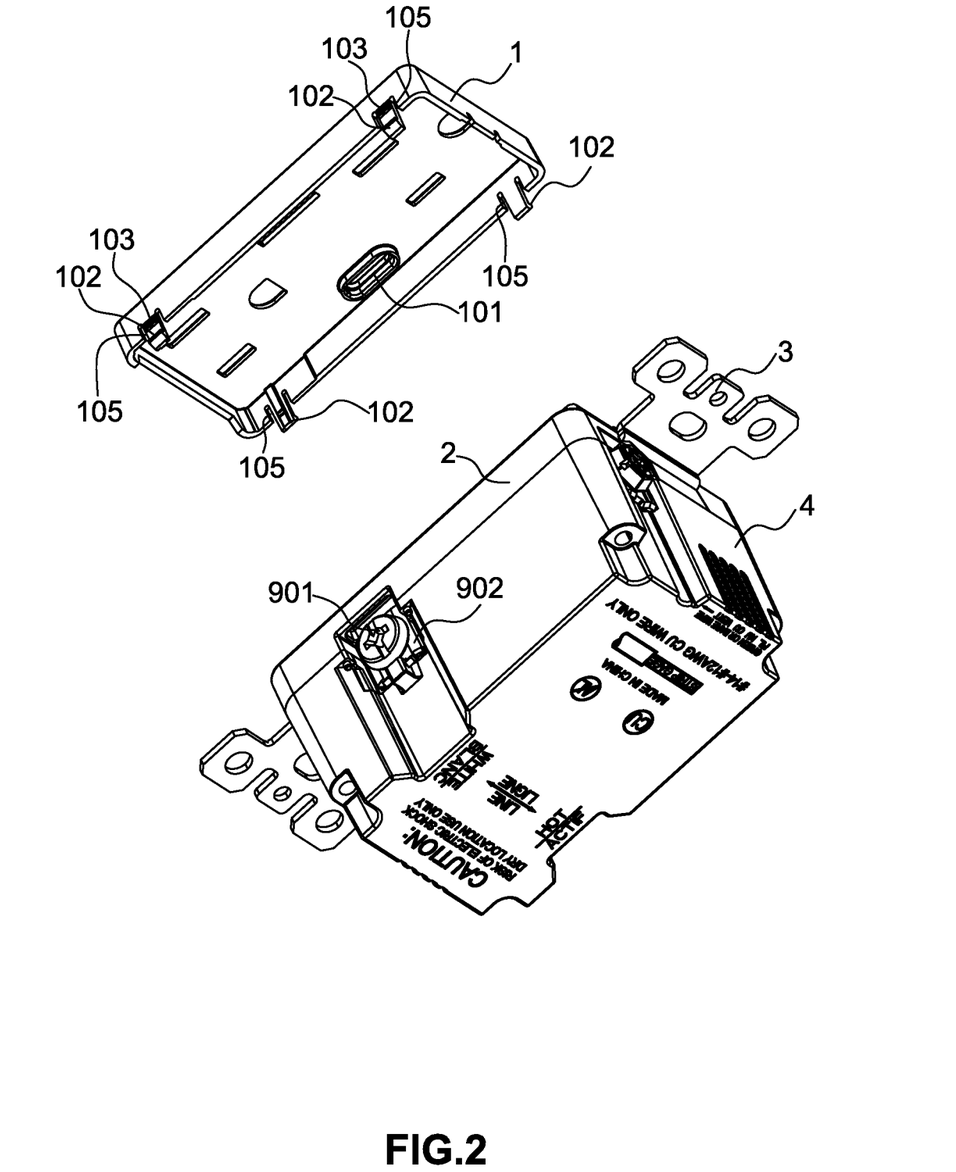
FIG. 2 illustrates the power supply receptacle of FIG. 1, viewed from the bottom.

Refer to FIGS. 1 and 2, which illustrate a power supply receptacle according to an embodiment of the present invention from two angles. The power supply receptacle includes a body, a core (mechanical and electrical assemblies) disposed inside the body, and an insertion plate assembly (the structure that receives the inserted prongs of a power plug). The body includes an upper body portion 2 and a base 4 connected to each other, for example by a plurality of fastening screws 12 (see FIG. 6). The base 4 is a high volume base, which provides larger space to accommodate the various components to realize a power receptacle having USB outputs with large current and fast charging abilities. The upper body portion 2 has a plurality of first output holes 203, i.e., the plug holes, which correspond to the insertion plates, and one or more second output holes 201. The second output holes correspond to circuit components within the body that provide USB power output, i.e., they are the USB output ports.

In this embodiment, the power supply receptacle further includes a top cover 1 disposed above the upper body portion 2. The top cover 1 has a plurality of openings, configured to change the shape or size of the first output holes 203 and/or the second output holes 201. More specifically, as shown in FIG. 1, the top cover 1 may have a first openings 104 corresponding to the first output holes 203 configured to receive prongs of a power plug, and second openings 101 corresponding to the second output holes 201 configured to receive USB plugs. The shape and sizes of the first openings 104 and second openings 101 are similar but not identical to those of the corresponding first output holes 203 and second output holes 201. This way, the output holes of the upper body portion 2 may function as guiding holes, and may have universal shapes that will accommodate connectors of a number of different formats, while the openings on the top cover 1 may have specific shapes for the specific formats. For example, in the illustrated embodiment, the second openings 101 may be made to fit one or more of USB Type-A or Type-C plugs, or other plugs. Further, different top covers 1 having different openings may be made to have different colors so that the user can install or change to different ones as needed.

As seen in FIGS. 1 and 2, in this embodiment, the top cover 1 and the upper body portion 2 may be connected by a snap connector, which may include, for example, one or more hooks and/or buckles disposed along edges of the top cover 1 and one or more corresponding buckles and/or hooks disposed along edges of the upper body portion 2. More specifically, the hooks 102 may be cantilevered arms extending from the edges of the top cover 1 (four are shown in the figures), with claws located at the free ends of the arms. Correspondingly, the buckles may be slots 202 located on the edges of the upper body portion 2. The claws of the hooks 102 can fit in and be retained in the slots 202 by resilient force, and when the arms are pressed in, the claws can be freed from the slots 202. This may be realized as follows. For example, a space 105 may be provided between the hooks 102 and the edges of the top cover 1 to allow the hooks 102 to move slightly, and when the top cover 1 is to be uninstalled, the user can press the hooks inwardly to free the hooks from the slots and remove the top cover. In some embodiments, at least a part of the outside surface of the hooks 102 may be provided with a friction structure 103, for example and without limitation, a line pattern, a cross hatch pattern, protruding dots or ridges, etc., to increase the friction between the user's fingers and the outer surface of the hooks, making it easy to remove the top cover 1, so that the user can complete the operation conveniently and quickly without using any tools.

The internal structure of the power supply receptacle is described below with reference to FIGS. 3-6.

Figure 6:
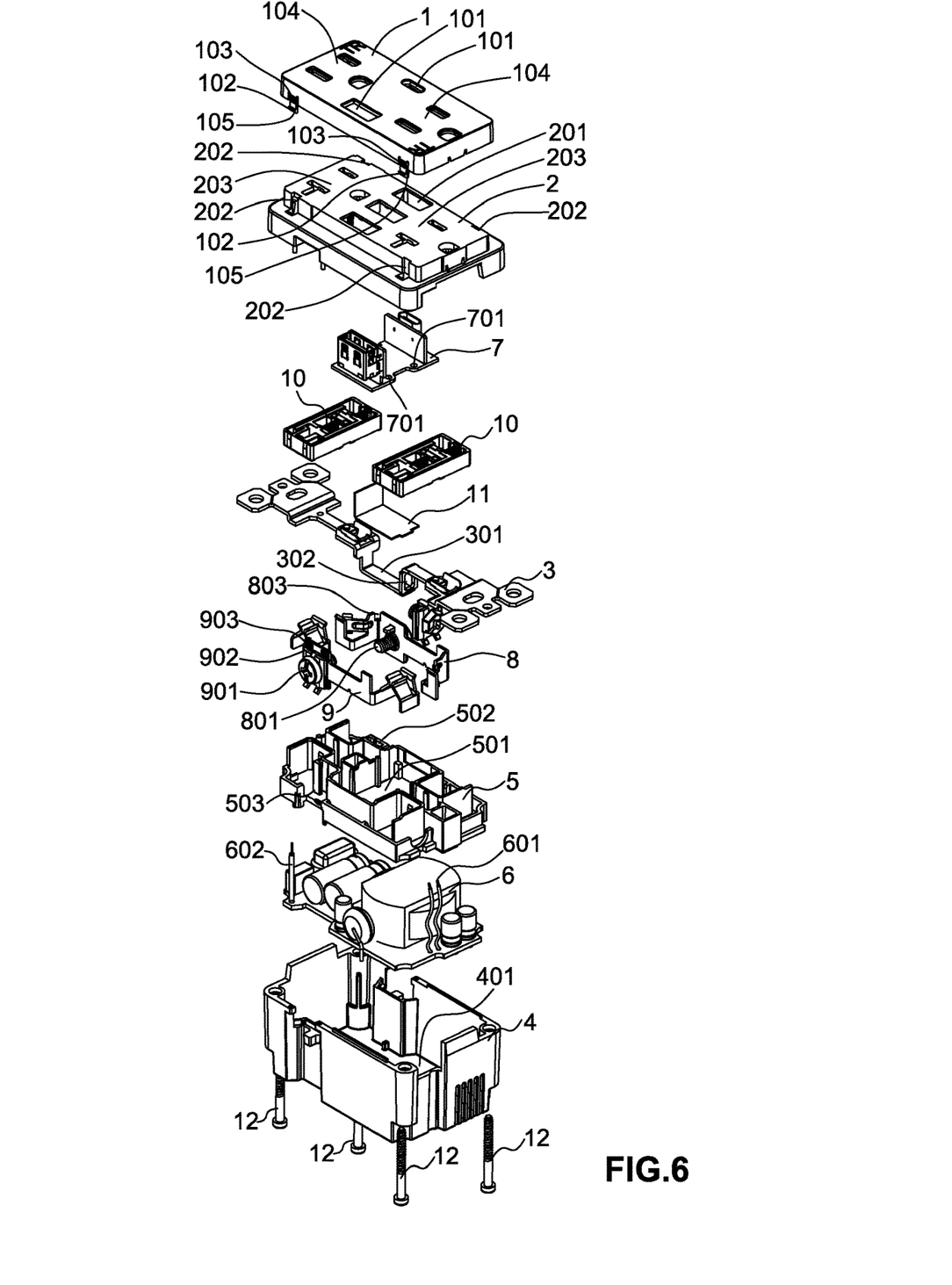
FIG. 6 is an exploded view of the portion of the power supply receptacle shown in FIG. 1.

According to embodiments of the present invention, the core of the power supply receptacle includes a first circuit board assembly 6 and a second circuit board assembly 7. The first circuit board assembly 6 is accommodated inside the base 4 and is potted with a high thermal conductivity material. The insertion plate assembly is mounted via a middle support frame 5 above the first circuit board assembly 6. The second circuit board assembly 7 is mounted via a grounding frame 3 above the middle support frame 5. As indicated earlier, the second circuit board assembly 7 is a PCB assembly for USB output, and includes at least one type of USB output port. As shown in FIG. 6, in this embodiment, the first circuit board assembly 6 is disposed in the interior 401 of the base 4, and has four conducting wires. Two of the wires are 120V input wires 602, which through the middle support frame 5 to couple to the wiring terminals of the insertion plate assembly, including the hot wiring terminal 803 of the hot insertion plate assembly 8 and the neutral wiring terminal 903 of the neutral insertion plate assembly 9, so as to supply input power to the first circuit board assembly 6. The other two wires of the first circuit board assembly 6 are 5V output wires 601, which pass through the middle support frame 5 and the wiring through holes 302 of the grounding frame 3, to respectively couple to the USB output PCB assembly, for example, by being soldered to the voltage input terminal 701 on the PCB of the PCB assembly, to supply power to the USB output PCB assembly.

As described earlier, the first circuit board assembly 6 is placed inside the base 4 and potted, for example by filling with a high thermal conductivity material such as a thermal adhesive, so as to pot the first circuit board assembly 6 with the thermal adhesive in the base to form an integral unit with the body. For this purpose, the base 4 is a plastic shell container without any openings on the sides or bottom, and the height of the thermal adhesive can reach the highest point of the first circuit board assembly. The thermal adhesive can seal the components that are potted and effectively conduct the heat out; it can also provide waterproof, dust proof, moisture proof, vibration resistance, drop impact resistance, fire resistance, and heat dissipation functions. It should be understood that the thermal adhesive may be any suitable material, including, without limitation, a single part or two part silica gel, a single part or two part resin, a single part or two part epoxy resin, etc.

Because the first circuit board assembly 6 is potted, and it is also desirable to ensure that the PCB has a sufficiently large area to place more components so as to provide more functions, the power supply device according to embodiments of the present invention advantageously places the insertion plate assembly with wiring terminals within the middle support frame 5, and locate the wiring terminals within the middle support frame 5. In other words, the wiring terminals of the hot insertion plate assembly 8 and neutral insertion plate assembly 9, which in conventional designs are placed inside the base, are moved to within the hot wiring terminal slot 502 and neutral wiring terminal slot 503 of the middle support frame 5 in the present embodiment, as shown in FIG. 6. This way, more space in the base 4 is provided for the first circuit board assembly 6 to meet the potting requirements.

Figure 3:
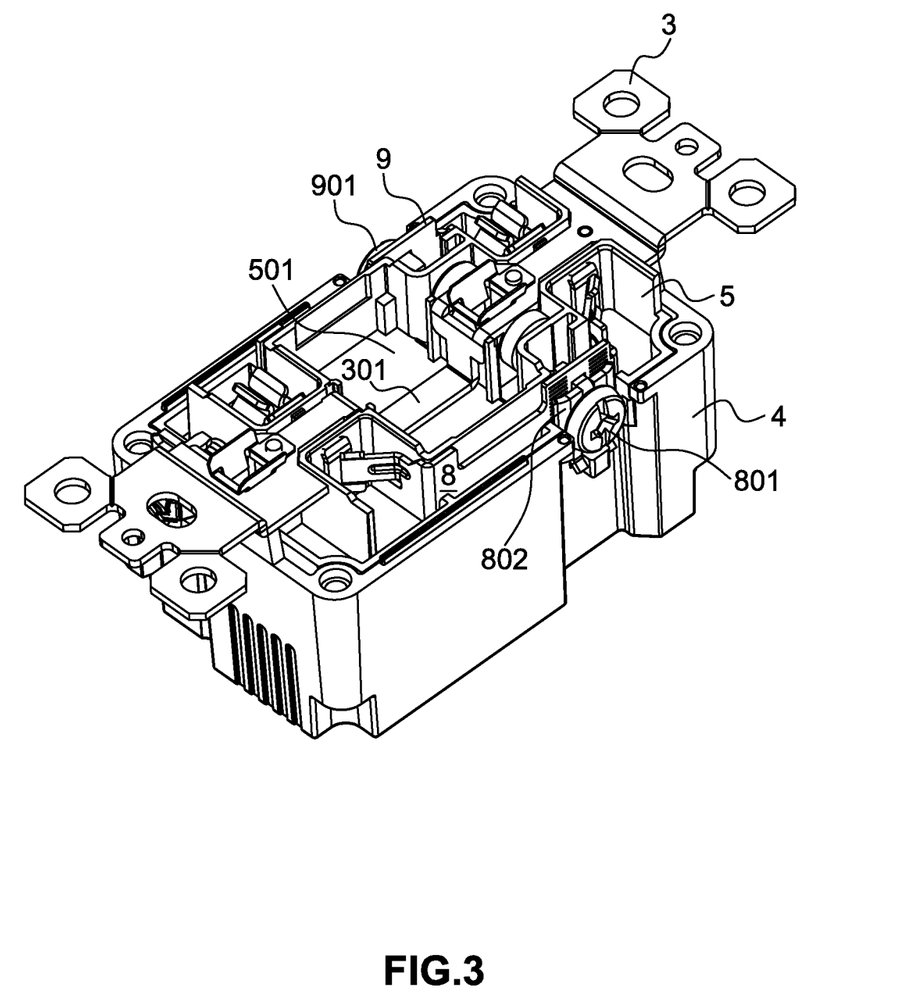
FIG. 3 illustrates the power supply receptacle of FIG. 1 with the top cover and the upper body portion removed.
Figure 7A:
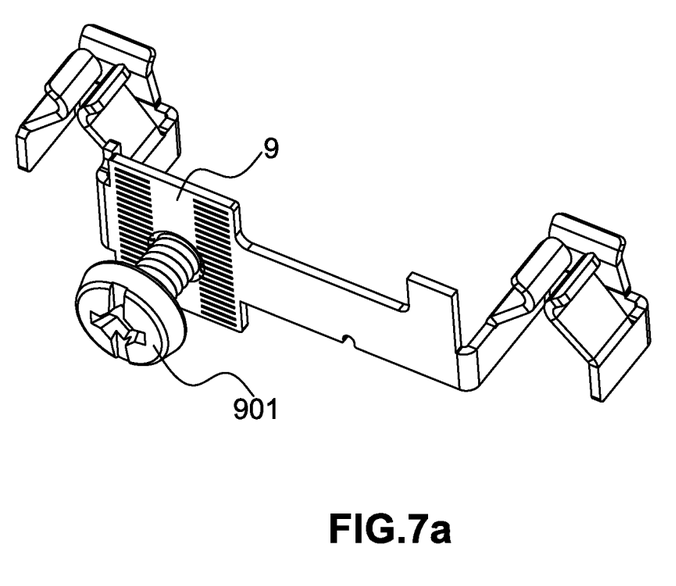
FIGS. 7a and 7b respectively illustrate examples of connections of the wiring terminal of the insertion plate assembly of the power supply receptacle according to embodiments of the present invention.
Figure 7B:
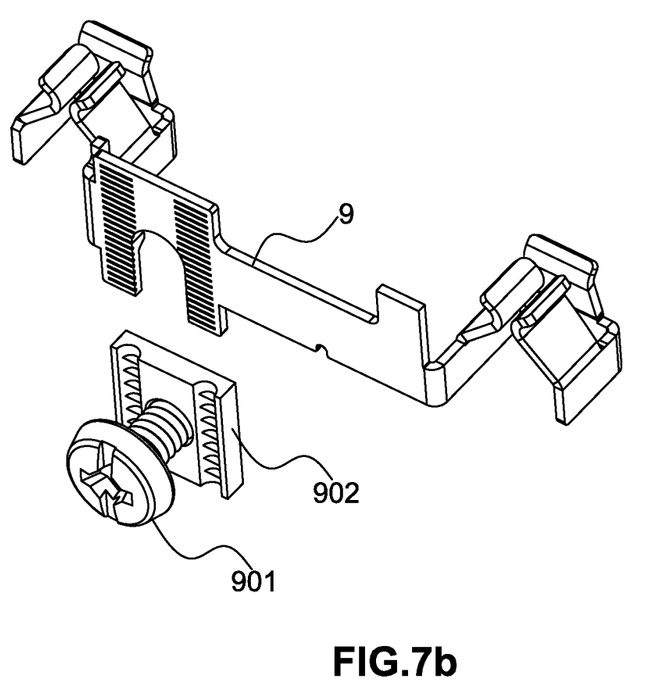

The wiring terminals of the insertion plate assembly may have any suitable structure. For example, in some embodiments, a screw 901 may be directly driven into the insertion plates, as shown in FIG. 7a. In some other embodiments, the screws 801, 901 may be connected to the insertion plates via wire pressing plates 802, 902 respectively, as shown in FIGS. 2 and 3 and FIG. 7b.

Figure 4:
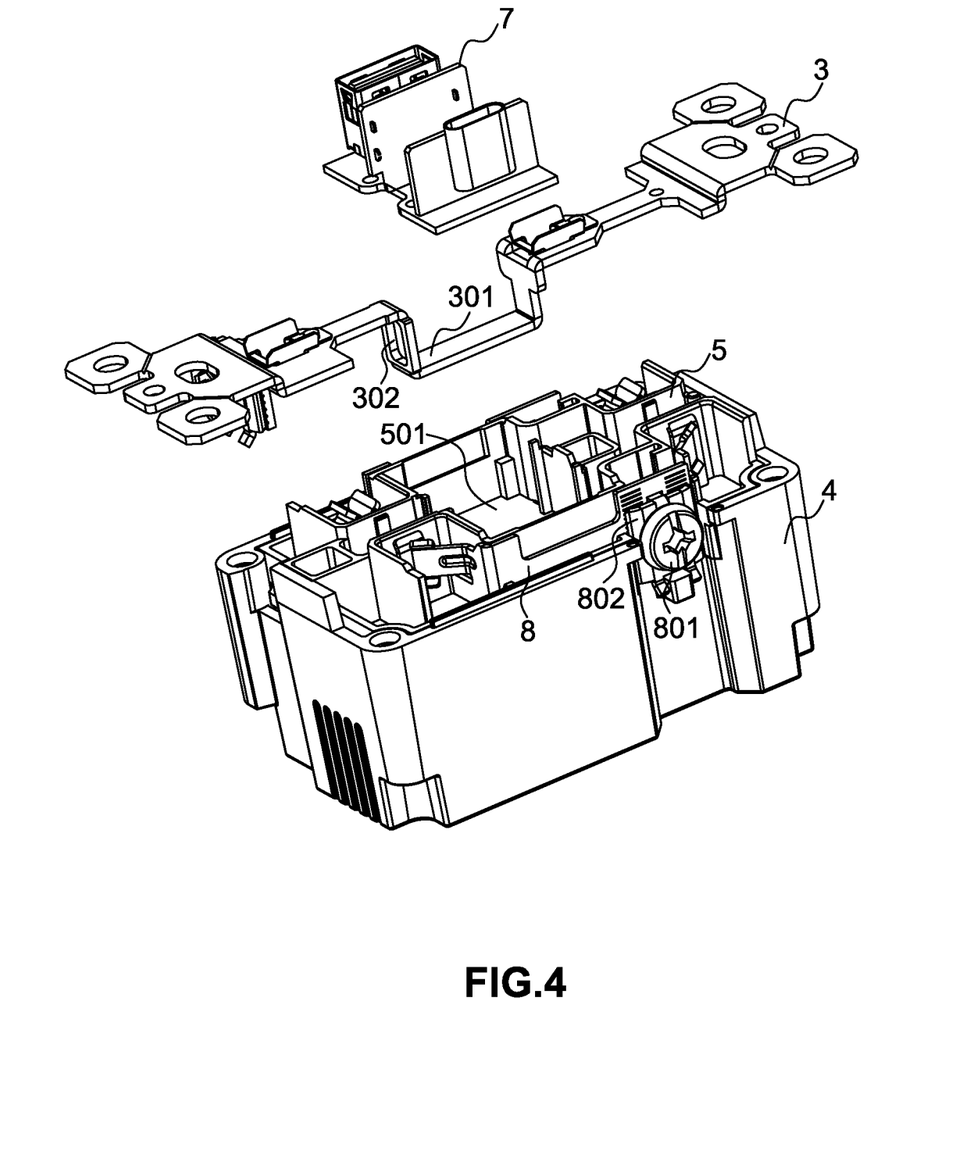
FIG. 4 is an exploded view of the portion of the power supply receptacle shown in FIG. 3.
Figure 5:
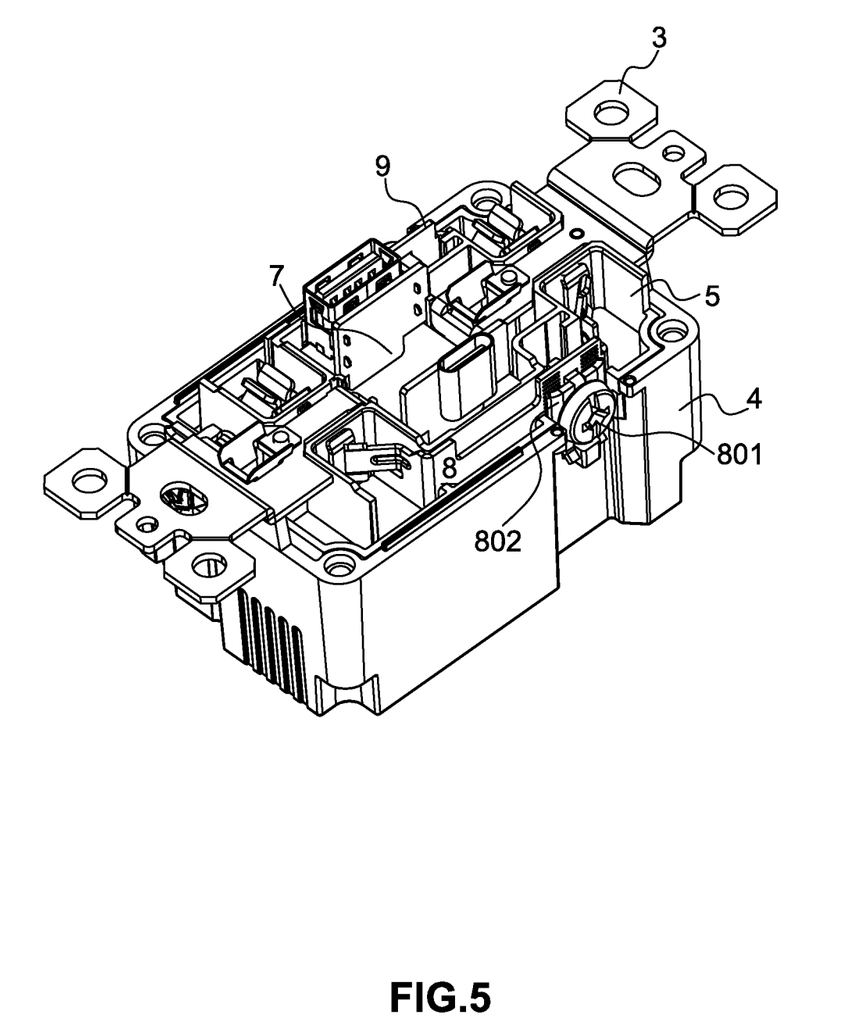
FIG. 5 illustrates the power supply receptacle of FIG. 3 with the PCB (printed circuit board) for the USB output components removed.

Referring to FIGS. 4-6, to accommodate the second circuit board assembly 7, the grounding frame 3 may be provided with a notch 301 that drops toward the base 4, i.e., a U shaped notch. An insulating plate 11 is provided between the notch 301 and the second circuit board assembly 7. Correspondingly, the middle support frame 5 is provided with a recessed area 501 for accommodating the second circuit board assembly 7 and the notch 301. This advantageously achieves the arrangements of multiple components in the limited space above the first circuit board assembly 6.

In some embodiment, the power supply receptacle optionally includes one or more assemblies that prevent inadvertent mis-insertion, disposed between the upper body portion 2 and the insertion plate assembly. For example, FIG. 6 illustrates two mis-insertion prevention assemblies 10. In this embodiment, to assemble the power supply receptacle device, as shown in FIG. 6, first, the first circuit board assembly 6 is placed in the base 4 and potted with an adhesive. Then, the middle support frame 5, the hot insertion plate assembly 8 and the neutral insertion plate assembly 9 are assembled to the body. Then, the grounding frame 3, the insulating plate 11 and the second circuit board assembly 7 are assembled, and the four conductive wires of the first circuit board assembly 6 are respectively soldered to their designated positions described above, to accomplish electrical connection. Lastly, the mis-insertion prevention assemblies 10, the upper body portion 2 and the top cover 1 are assembled, and the upper body portion 2 and the base 4 are fastened together by the fastening screws 12. It should be noted that the coupling between the upper body portion and the base may also use the snap connector similar to those used to connect the upper body portion and the top cover as described earlier.

Figure 8A:
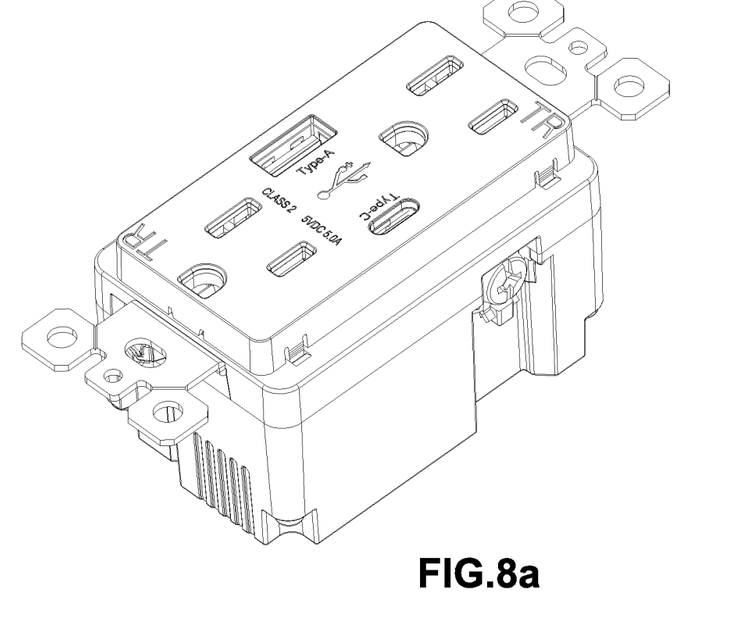
FIGS. 8a to 8f illustrate examples of different models of the power supply receptacle having different top covers.
Figure 8B:
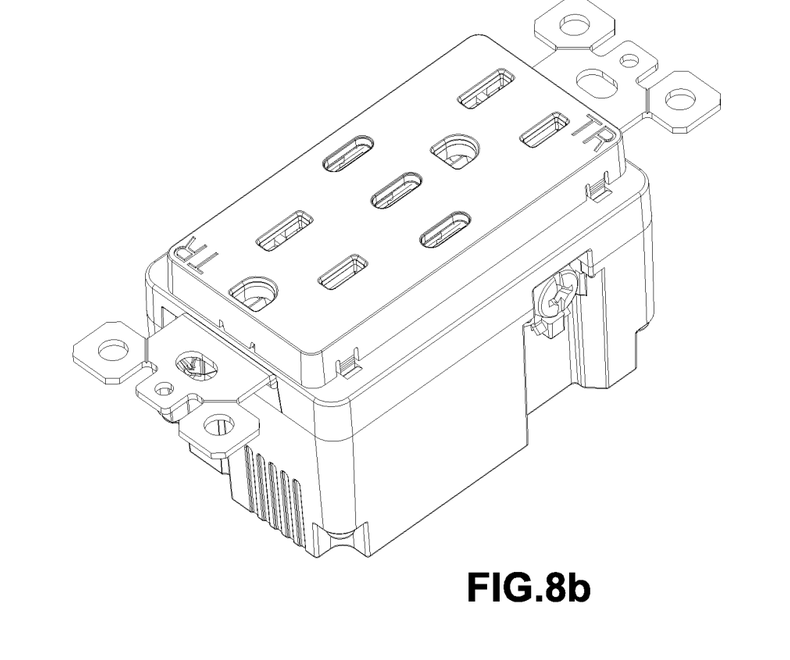
Figure 8C:
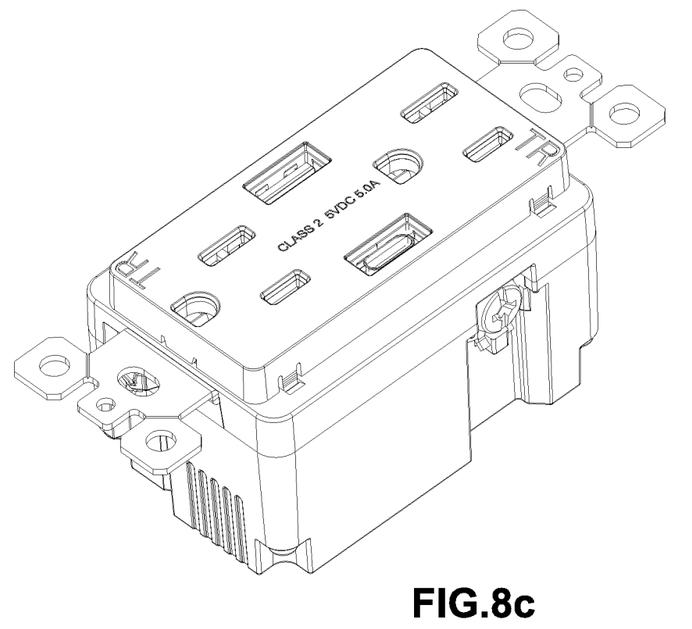
Figure 8D:
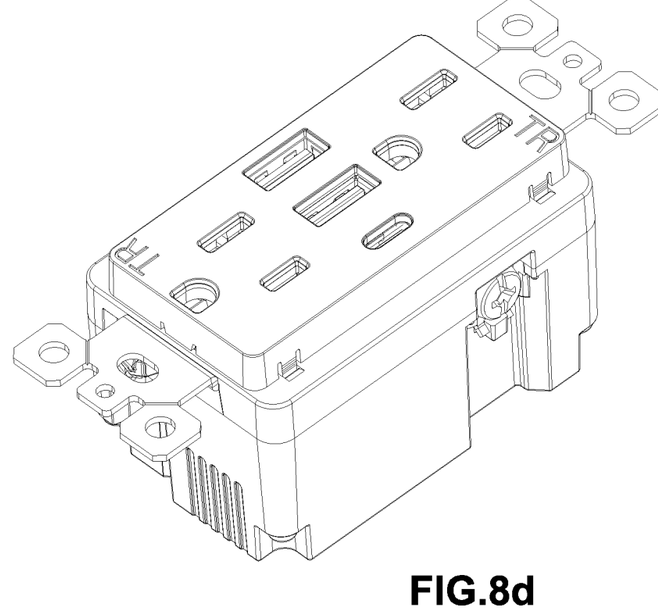
Figure 8E:
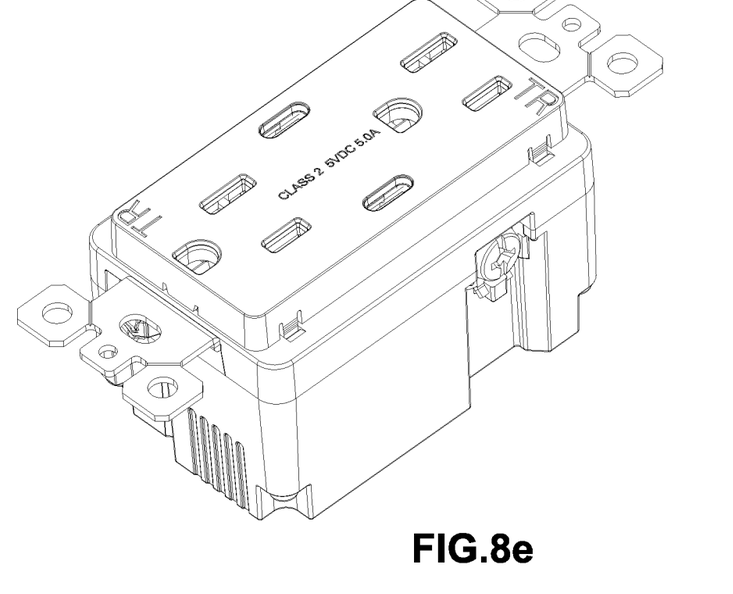
Figure 8F:
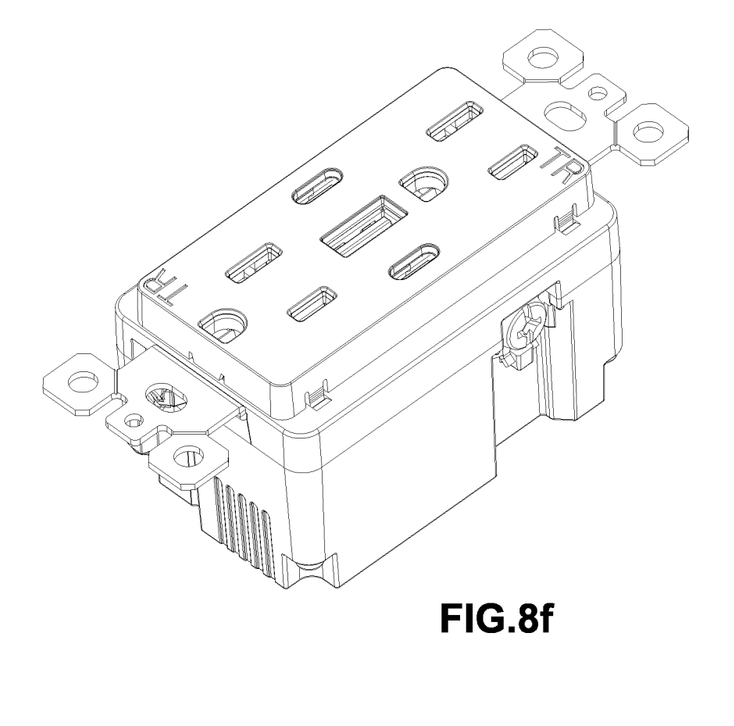

As examples, FIGS. 8a-8f show a number of formats of the openings of the top cover, in particular, various different combinations of the second openings, which can be used together with the same upper body portion to form various different devices with different USB port combinations. More specifically, FIG. 8a shows a power supply receptacle with one Type-A USB port and one Type-C USB port; FIG. 8b shows a device with three Type-C USB ports; FIG. 8c shows a device with two Type-A USB ports; FIG. 8d shows a device with two Type-A USB ports and one Type-C USB port; FIG. 8e shows a device with two Type-C USB ports; and FIG. 8f shows a device with two Type-C USB ports and one Type-A USB port. It should be noted that other combinations not shown here may be provided.

From the above descriptions, it can be seen that embodiments of the present invention provide a power supply receptacle with a single power source combined with multiple output ports to provide multiple different types of charging power output ports. It provides many power output ports within a limited space, and also effectively prevents overheating by potting many internal components of the device. In addition, by using a top cover that can be disassembled easily by users, assembling of the device is made easier, and the color of the face plate of the device can be more easily changed. This enhances the functionality of the device, improves the applicability of the device, and improves user experience.

It will be apparent to those skilled in the art that various modification and variations can be made in the power supply receptacle of the present invention without departing from the spirit or scope of the invention. Thus, it is intended that the present invention cover modifications and variations that come within the scope of the appended claims and their equivalents.

What is claimed is:

1. A wall mounted power supply receptacle device, comprising:
   a body;
   a core disposed inside the body; and
   an insertion plate assembly;
   wherein the body includes a upper body portion and a base connected to each other,
   wherein the core includes a first circuit board assembly and a second circuit board assembly, wherein the first circuit board assembly is accommodated inside the base and is potted with a high thermal conductivity material,
   wherein the core further includes a middle support frame and a grounding frame,
   wherein the insertion plate assembly includes insertion plates and wiring terminals and is mounted via the middle support frame above the first circuit board assembly, and the second circuit board assembly is mounted via the grounding frame above the middle support frame, wherein the grounding frame includes a U shaped notch that drops toward the base and the second circuit board assembly is disposed in the U shaped notch, and wherein the grounding frame has wiring holes and the second circuit board assembly is electrically coupled to the first circuit board assembly through the wiring holes.

2. The device of claim 1, wherein the second circuit board assembly is a PCB (printed circuit board) assembly for USB (Universal Serial Bus) output and includes at least one USB output port.

3. The device of claim 1, further comprising an insulating plate disposed between the U shaped notch and the second circuit board assembly.

4. The device of claim 1, wherein the upper body portion includes a plurality of first output holes corresponding to the insertion plate assembly and at least one second output hole correspond to the second circuit board assembly, wherein the device further comprises a top cover connected to the upper body portion by a snap connector, and wherein the top cover includes a plurality of openings, wherein at least one of the plurality of openings corresponds to a second output hole of the upper body portion and has a different shape or size than the corresponding second output hole.

5. The device of claim 4, wherein the snap connector includes at least one hook and/or buckle disposed along an edge of the top cover and at least one corresponding buckle and/or hook disposed along an edge of the upper body portion.

6. The device of claim 5, wherein the hook includes a cantilevered arm extending from the edge of the top cover or the edge of the upper body portion, and a claw located at a free end of the arm, wherein the buckle include a slot located on the edge of the upper body portion or the edge of the top cover, wherein the claw of the hook is configured to fit in and be retained in the slot by a resilient force and configured to be freed from the slot when the arm is pressed in.

7. The device of claim 6, wherein at least a part of an outside surface of the hook has a friction structure.

8. The device of claim 7, wherein the friction structure includes one or more of a line pattern, a cross hatch pattern, protruding dots, or protruding ridges.

9. The device of claim 1, further comprising at least one mis-insertion prevention assembly disposed between the upper body portion and the insertion plate assembly.

10. The device of claim 1, wherein the wiring terminal of the insertion plate assembly is either connected directly to the insertion plates or connected to the insertion plates via pressing plates.

11. A wall mounted power supply receptacle device, comprising:
a top cover;
a body;
a core disposed inside the body; and
an insertion plate assembly;

wherein the body includes a upper body portion and a base connected to each other, wherein the core includes a first circuit board assembly and a second circuit board assembly, wherein the first circuit board assembly is accommodated inside the base and is potted with a high thermal conductivity material, wherein the insertion plate assembly and the second circuit board assembly are disposed above the first circuit board assembly, wherein the top cover is connected to the upper body portion, and wherein the top cover includes a plurality of first openings and a plurality of second openings, the first openings configured to receive prongs of a power plug, and the second openings configured to receive one or more of an USB (Universal Serial Bus) Type-A plug or a USB Type-C plug.

12. The device of claim 11, wherein the second circuit board assembly is a PCB (printed circuit board) assembly for USB output and includes at least one USB output port.

13. The device of claim 11, wherein the upper body portion includes a plurality of first output holes corresponding to the insertion plate assembly and at least one second output hole correspond to the second circuit board assembly, wherein at least one of the plurality of second openings of the top cover corresponds to a second output hole of the upper body portion and has a different shape or size than the corresponding second output hole.

14. The device of claim 11, wherein the top cover and the upper body portion are connected to each other by a snap connector which includes at least one hook and/or buckle disposed along an edge of the top cover and at least one corresponding buckle and/or hook disposed along an edge of the upper body portion.

15. The device of claim 14, wherein the hook include a cantilevered arm extending from the edge of the top cover or the edge of the upper body portion, and a claw located at a free end of the arm, wherein the buckle include a slot located on the edge of the upper body portion or the edge of the top cover, wherein the claw of the hook is configured to fit in and be retained in the slot by a resilient force and configured to be freed from the slot when the arm is pressed in.

16. The device of claim 15, wherein at least a part of an outside surface of the hook has a friction structure.

17. The device of claim 16, wherein friction structure includes one or more of a line pattern, a cross hatch pattern, protruding dots, or protruding ridges.

18. The device of claim 11, further comprising at least one mis-insertion prevention assembly disposed between the upper body portion and the insertion plate assembly.

19. The device of claim 11, wherein the wiring terminal of the insertion plate assembly is either connected directly to the insertion plates or connected to the insertion plates via pressing plates.

* * * * *